May 4, 1926.

H. O. HEM 1,583,251

ROCKER BEARING

Filed March 18, 1921

Witness
C. E. Wilcox.

Inventor
HALLVOR O. HEM.

By C. O. Marshall
Attorney

Patented May 4, 1926.

1,583,251

UNITED STATES PATENT OFFICE.

HALVOR O. HEM, OF TOLEDO, OHIO, ASSIGNOR TO TOLEDO SCALE COMPANY, OF TOLEDO, OHIO, A CORPORATION OF NEW JERSEY.

ROCKER BEARING.

Application filed March 18, 1921. Serial No. 453,307.

*To all whom it may concern:*

Be it known that I, HALVOR O. HEM, a citizen of the United States, residing at Toledo, in the county of Lucas and State of Ohio, have invented certain new and useful Improvements in Rocker Bearings, of which the following is a specification.

This invention relates to bearings, and particularly to rocker bearings such as are employed in weighing scales and other instruments of precision, and one of its objects is to provide a bearing from which friction is substantially eliminated.

Another object of the invention is the provision of a substantially frictionless bearing which is subject to very little wear.

Still another object is to provide a mounting for bearing discs which permits the discs to automatically position themselves with their axes parallel to the axis of a rocking member supported upon them.

Other objects and advantages will be apparent from the following description, in which reference is had to the accompanying drawings illustrating a preferred embodiment of my invention and wherein similar reference numerals designate similar parts throughout the several views.

In the drawings:—

For the purpose of facilitating the description of my invention and making its function clear, I have shown it as supporting a pendulum such as is used in weighing scales. It is to be understood, however, that the bearing is adapted to support the pivots of levers and other rocking members as well as rotatable shafts, and that the relation in which it is here shown is illustrative only.

The portion of the frame 1 which supports the bearing has a flat upper surface and is provided with a bore snugly receiving a pin 2 which passes loosely through an opening in the lower side of a short channel-shaped member 3 rotatable about the pin so that the channel-shaped member is swiveled upon the frame.

Figure 1:
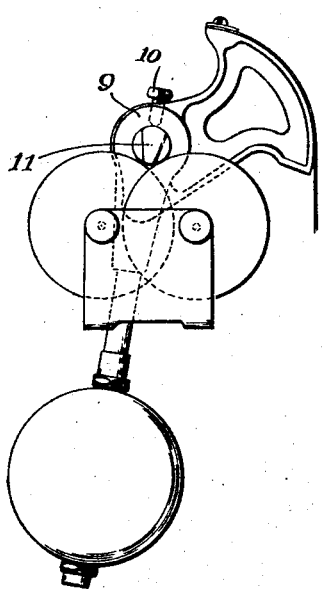
Figure 1 is a side elevation of a weighing pendulum supported by a rocking pivot and bearing embodying my invention.
Figure 4:
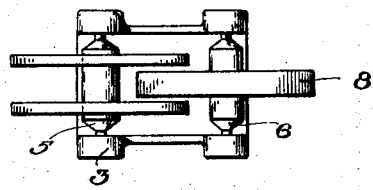
Figure 4 is a plan view of the bearing with the pivot removed.
Figure 2:
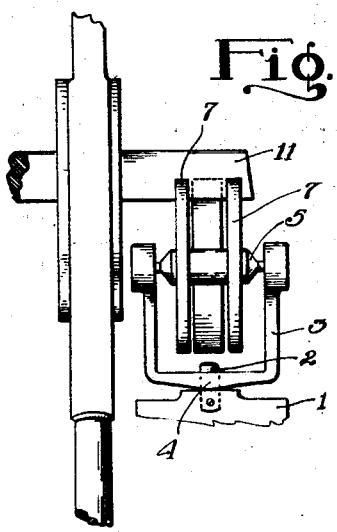
Figure 2 is an enlarged front elevation of the bearing shown in Figure 1, a part of the pivot and the pendulum supported thereby being broken away.
Figure 3:
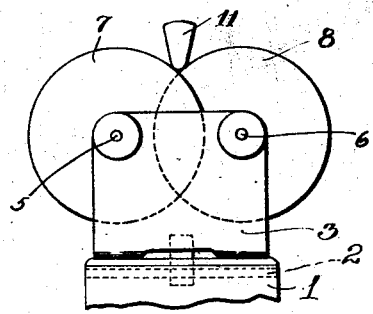
Figure 3 is an enlarged side elevation of the pivot and bearing.

The lower side of the channel-shaped member is beveled, as shown in Figure 2, to form a downwardly-projecting ridge 4 with its apex extending below the longitudinal center of the member, the central portion of the ridge 4 being cut away so that only the ends are in contact with the frame 1, the channel member being loosely mounted on the pin so that it may rock slightly on the apex of the ridge 4.

Extending across the channel member 3 at the ends thereof are axles 5 and 6 preferably journaled in ball bearings so as to be freely rotatable. The axle 5 carries a pair of discs 7, preferably of hardened steel, and the axle 6 carries a thicker disc 8 of the same material, all of the discs preferably being of the same diameter.

The pendulum 9 has an opening in the upper end of its stem through which extends a pivot bar 11. The bar 11, which is fixed to the pendulum 9 by any suitable means, such as a set screw 10, projects from each side of the pendulum and lies upon two sets of bearing discs swivelly mounted as above described, one set supporting the bar 11 on each side of the pendulum. The bearing at the left side of the pendulum, being identical with the one on the right side, is not shown in the drawing. The lower side of the bar 11 is substantially semi-cylindrical in shape, the radius of curvature being quite short so that the movements of the discs 7 and 8 caused by rocking the bar 11 is very slight. When it is desired that the bar be completely revoluble, it must, of course, be a complete cylinder of sufficient diameter to possess the requisite strength. Since the rocking movement in this case is only a fraction of a revolution, the lower surface need only be great enough to prevent appreciable change of form in use, the requisite strength residing in the enlarged upper portion.

In operation, when the pivot bar 11 is placed upon the discs 7 and 8, the channel member shifts about the axis of the pin 2 and rocks upon the apex of the ridge 4 until the axes of the discs 7 and 8 are parallel to the axis of the cylindrical portion of the pivot bar 11. With the axes of rotation of the discs and the bar in this relation, the pendulum may swing about the axis of the semi-cylindrical lower side of the bar 11 without appreciable friction. The device thus possesses substantially the advantages of a knife-edge pivot and bearing without its attendant frailty and liability to wear.

While it will be apparent that the illustrated embodiment of my invention herein disclosed is well calculated to adequately fulfill the objects primarily stated, it is to be understood that the invention is susceptible to variation, modification and change within the spirit and scope of the subjoined claims.

Having described my invention, I claim:

1. In a device of the class described, in combination, a frame, a supporting member pivoted thereto on a substantially vertical axis and a substantially horizontal axis, and discs mounted upon said member to rotate about axes extending in directions substantially at right angles to the directions of the pivotal axes of said supporting member.

2. In a device of the class described, in combination, a frame, a supporting member pivoted thereto on a substantially vertical axis and a substantially horizontal axis, discs mounted upon said member to rotate about axes extending in directions substantially at right angles to the direction of the pivotal axes of said supporting member, and a pivot bar having a cylindrical surface of small radius resting upon said discs.

3. In a device of the class described, in combination, a frame, a supporting member pivoted thereto on a substantially vertical axis and a substantially horizontal axis, discs mounted upon said member to rotate about axes extending in directions substantially at right angles to the direction of the pivotal axes of said supporting members, and a pivot bar having a cylindrical surface of small radius resting upon said discs, the bar being of greater cross-sectional area than a cylinder of the same radius as the cylindrical portion of the bar.

4. In a device of the class described, in combination, a frame member, a supporting member swively and rockably supported thereon, and overlapping bearing members having curved surfaces rotatably supported by said supporting member.

5. In a device of the class described, in combination, a frame member, a supporting member swively and rockably supported thereon, and overlapping bearing discs rotatably supported by said supporting member.

6. In a device of the class described, in combination, a frame member, a substantially channel-shaped supporting member swively and rockably supported thereon, and overlapping bearing members having curved surfaces rotatably supported by said supporting member.

7. In a device of the class described, in combination, a frame member, a supporting member swively and rockably supported thereon, overlapping bearing members having curved surfaces supported by said supporting member, and a pivot bar having a partially cylindrical lower surface supported upon said curved surfaces and an enlarged upper portion.

8. In a device of the class described, in combination, a frame member, a supporting member swively and rockably supported thereon, overlapping bearing members having curved surfaces supported by said supporting member, a pendulum, and a pivot bar fixed to said pendulum and resting upon said overlapping bearing members.

HALVOR O. HEM.